United States Patent
Butler et al.

(10) Patent No.: US 6,972,047 B2
(45) Date of Patent: Dec. 6, 2005

(54) INCORPORATION OF GILSONITE INTO ASPHALT COMPOSITIONS

(75) Inventors: James R. Butler, Friendswood, TX (US); Kevin P. Kelly, Friendswood, TX (US); Paul J. Buras, West University Place, TX (US); Bill Lee, Humble, TX (US)

(73) Assignee: Fina Technology, Inc., Houston, TX (US)

( * ) Notice: Subject to any disclaimer, the term of this patent is extended or adjusted under 35 U.S.C. 154(b) by 64 days.

(21) Appl. No.: 10/750,438

(22) Filed: Dec. 31, 2003

(65) Prior Publication Data

US 2005/0145136 A1    Jul. 7, 2005

(51) Int. Cl.[7] ........................ C09D 195/00; C08L 95/00
(52) U.S. Cl. ........................ 106/279; 106/280; 106/278
(58) Field of Search ............................. 106/278, 279, 106/280

(56) References Cited

U.S. PATENT DOCUMENTS

| | | | | |
|---|---|---|---|---|
| 2,492,848 A | * | 12/1949 | Crouch et al. | 427/156 |
| 3,074,807 A | * | 1/1963 | Dorius et al. | 106/273.1 |
| 4,033,784 A | * | 7/1977 | Lawson et al. | 134/20 |
| 4,094,696 A | * | 6/1978 | Burris | 106/277 |
| 4,282,037 A | * | 8/1981 | Burris | 106/164.51 |

OTHER PUBLICATIONS

American Gilsonite Company [Internet]. "Welcome!"; [updated 2003 Feb 8; cited 2003 Feb. 11]. Available from: http//www.americangilsonite.com/content_frame.htm and http//www.americangilsonite.com/products2.html.

Ziegler Chemical & Mineral Corporation [Internet]. "What is Gilsonite?"; [copyright 1997-2000; cited Feb. 11, 2003]. Available from: http//zieglerchemical.com/gilsonit.htm.

Ziegler Chemical & Mineral Corporation [Internet]. "Gilsonite Compatibility"; [copyright 1997-2000; cited Feb. 11, 2003]. Available from: http//zieglerchemical.com/compatib.htm.

Ziegler Chemical & Mineral Corporation [Internet]. "Gilsonite Solubility"; [copyright 1997-2000; cited Feb. 11, 2003]. Available from: http//zieglerchemical.com/solubil.htm.

Ziegler Chemical & Mineral Corporation [Internet]. "Gilsonite Solutions"; [copyright 1997-2000; cited Feb. 11, 2003]. Available from: http//zieglerchemical.com/solution.htm.

* cited by examiner

Primary Examiner—David Brunsman
(74) Attorney, Agent, or Firm—Madan, Mossman & Sriram; Tenley R. Krueger

(57) ABSTRACT

It has been discovered that a synthetic flux oil can contain and deliver asphaltites, such as gilsonite, more easily and readily to an asphalt to improve its properties. The synthetic flux oil includes the asphaltite and a carrier oil. Depending on the nature of the carrier oil, the synthetic flux oil may or may not need to be heated during mixing and incorporation into the asphalt.

19 Claims, No Drawings

INCORPORATION OF GILSONITE INTO ASPHALT COMPOSITIONS

FIELD OF THE INVENTION

The present invention is related to hydrocarbon-based binders, such as bitumens, asphalts and tars, modified with asphaltites such as gilsonite, and is more particularly related to processes and compositions for incorporating asphaltites into asphalt binders.

BACKGROUND OF THE INVENTION

The use of bitumen (asphalt) compositions in preparing aggregate compositions (including, but not just limited to, bitumen and rock) useful as road paving material is complicated by at least three factors, each of which imposes a serious challenge to providing an acceptable product. First, the bitumen compositions must meet certain performance criteria or specifications in order to be considered useful for road paving. For example, to ensure acceptable performance, state and federal agencies issue specifications for various bitumen applications including specifications for use as road pavement. Current Federal Highway Administration specifications require a bitumen (asphalt) product to meet defined parameters relating to properties such as viscosity, toughness, tenacity and ductility. Each of these parameters defines a critical feature of the bitumen composition, and compositions failing to meet one or more of these parameters will render that composition unacceptable for use as road pavement material.

Conventional bitumen compositions frequently cannot meet all of the requirements of a particular specification simultaneously and, if these specifications are not met, damage to the resulting road can occur, including, but not necessarily limited to, permanent deformation, thermally induced cracking and flexural fatigue. This damage greatly reduces the effective life of paved roads.

In this regard, it has long been recognized that the properties of conventional bitumen compositions can be modified by the addition of other substances, such as polymers and asphaltites such as gilsonite.

Gilsonite and other asphaltites are used as performance-enhancing agents for asphalt mixes. Gilsonite-modified paving mixes achieve higher performance grades (PG) and incorporate into an asphalt blend with no need for high shear milling as in the case with some other modifiers. The use of SBS (styrene-butadiene-styrene) polymers may be partially or totally replaced by, or complemented by, the presence of gilsonite. Gilsonite-modified asphalts can have higher stability, reduced deformation, reduced temperature susceptibility and increased resistance to water stripping as compared to non-modified asphalts. A difficulty in using gilsonite as an asphalt modifier is that it is a solid, which is more difficultly handled and incorporated into a viscous bitumen.

On the other hand, a wide variety of polymers have been used as additives in bitumen compositions. For example, copolymers derived from styrene and conjugated dienes, such as butadiene or isoprene, are particularly useful, since these copolymers have good solubility in bitumen compositions and the resulting modified-bitumen compositions have good rheological properties.

It is also known that the stability of polymer-bitumen compositions can be increased by the addition of crosslinking agents such as sulfur, frequently in the form of elemental sulfur. It is believed that the sulfur chemically couples the polymer and the bitumen through sulfide and/or polysulfide bonds. The addition of extraneous sulfur is required to produce the improved stability, even though bitumens naturally contain varying amounts of native sulfur.

A second factor complicating the use of bitumen compositions concerns the viscosity stability of such compositions under storage conditions. In this regard, bitumen compositions are frequently stored for up to 7 days or more before being used and, in some cases, the viscosity of the composition can increase so much that the bitumen composition is unusable for its intended purpose. On the other hand, a storage stable bitumen composition would provide for only minimal viscosity increases and, accordingly, after storage it can still be employed for its intended purpose.

A third factor complicating the use of bitumen compositions concerns the use of volatile solvents in such compositions. Specifically, while such solvents have been heretofore proposed as a means to fluidize bitumen-polymer compositions containing relatively small amounts of sulfur which compositions are designed as coatings, environmental concerns restrict the use of volatile solvents in such compositions. Moreover, the use of large amounts of volatile solvents in bitumen compositions may lower the viscosity of the resulting composition so that it no longer meets viscosity specifications designated for road paving applications. In addition to the volatile components, reduction of other emissions during asphalt applications becomes a target. For example, it is desirable to reduce the amount of sulfur compounds that are emitted during asphalt applications.

Asphaltic concrete, typically including asphalt and aggregate, asphalt compositions for resurfacing asphaltic concrete, and similar asphalt compositions must exhibit a certain number of specific mechanical properties to enable their use in various fields of application, especially when the asphalts are used as binders for superficial coats (road surfacing), as asphalt emulsions, or in industrial applications. (The term "asphalt" is used herein interchangeably with "bitumen." Asphaltic concrete is asphalt used as a binder with appropriate aggregate added, typically for use in roadways.) The use of asphalt or asphalt emulsion binders either in maintenance facings as a surface coat or as a very thin bituminous mix, or as a thicker structural layer of bituminous mix in asphaltic concrete, is enhanced if these binders possess the requisite properties such as desirable levels of elasticity and plasticity.

As noted, various polymers have been added to asphalts to improve physical and mechanical performance properties. Polymer-modified asphalts (PMAs) are routinely used in the road construction/maintenance and roofing industries. Conventional asphalts often do not retain sufficient elasticity in use and, also, exhibit a plasticity range that is too narrow for use in many modern applications such as road construction. It is known that the characteristics of road asphalts and the like can be greatly improved by incorporating into them an elastomeric-type polymer which may be one such as butyl, polybutadiene, polyisoprene or polyisobutene rubber, ethylene/vinyl acetate copolymer, polyacrylate, polymethacrylate, polychloroprene, polynorbornene, ethylene/propylene/diene (EPDM) terpolymer and advantageously a random or block copolymer of styrene and a conjugated diene. The modified asphalts thus obtained commonly are referred to variously as bitumen/polymer binders or asphalt/polymer mixes. Modified asphalts and asphalt emulsions often are produced utilizing styrene/butadiene based polymers, and typically have raised softening point, increased viscoelasticity, enhanced force under strain, enhanced strain recovery, and improved low temperature strain characteristics as compared with non-modified asphalts and asphalt emulsions.

The bituminous binders, even of the bitumen/polymer type, which are presently employed in road applications often do not have the optimum characteristics at low enough polymer concentrations to consistently meet the increasing structural and workability requirements imposed on roadway structures and their construction. In order to achieve a given level of modified asphalt performance, various polymers are added at some prescribed concentration.

More specifically, to be used in road materials, however, asphalt must first meet certain specifications. For example, as a result of the Strategic Highway Research Program (SHRP), the Federal Highway Administration (FHA) has developed a battery of tests and specifications for asphalt, designed to ensure that road materials have a longer lifetime before requiring maintenance or replacement. Such specifications may be categorized as comprising high, intermediate and low temperature Performance Grade (PG) tests, and compatibility tests, when a polymer, such as rubber, is added to the asphalt. Further information about the specifications can be found in the booklet SUPERPAVE Series No. 1 (SP-1), 1997 printing, published by the Asphalt Institute (Research Park Drive, P.O. Box 14052, Lexington, Ky. 40512-4052), which is hereby incorporated by reference in its entirety, and is hereinafter referred to as MP1 (Standard Specification for Performance Graded Asphalt Binder). In addition, some agencies have adopted Compatibility tests to prevent separation of polymer and asphalt.

If a particular asphalt does not pass the minimum specifications for all of the above-described MP1 tests, then the asphalt will not be shipped from an oil refinery to a hot mix plant for use as road material. Various procedures have therefore been developed to improve the rheological properties of asphalt, so that it will meet the minimum requirements of the MP1 tests. The development of such procedures has a direct impact on the cost effective production of asphalt because it allows for greater amounts of asphaltenes to be included in the asphalt shipped to the hot mix plant.

As noted, one procedure to alter asphalt's rheological properties, for example, is to add polymers to asphalt to produce PMA. There is a risk, however, of PMAs failing the compatibility test. As noted, this may necessitate further processing steps, such as cross-linking of the polymer to thereby improve the asphalt's compatibility. Furthermore, because the cost of polymers and cross-linking agents are substantially higher than the cost of asphaltene, and there are costs for the additional processing steps, it may be difficult to produce PMA for profit.

Another procedure is to add conventional flux oil to soften asphaltenes to a desired consistency and therefore affect the rheological properties of the resulting asphalt. The improvement in performance grade by adding such flux oils is problematic, however. For instance, certain conventional flux oils may decrease both the high intermediate and low temperature PG test values, in proportion to the amount of flux oil present in asphalt. Thus, while an asphalt containing a high amount of flux oil may have an acceptable intermediate or low temperature PG test value, the asphalt may not have an acceptable high PG test value. In addition, because flux oil is substantially more expensive than asphaltenes, an asphalt having a high flux oil content may be difficult to make profitable. Conversely, an asphalt with a low flux oil content, while being less expensive to produce, may not have acceptable PG test values.

As noted, the addition of solid asphaltites, also known as asphaltums, uintaites or uintahites, such as gilsonite, to asphalt is another procedure known to alter the rheological properties of asphalt. As noted, the use of solid asphaltites, however, is not ideally suited for an oil refinery environment. Rather, in a refinery, it is more desirable to handle and mix fluids. Moreover, the properties of solid asphaltites may vary from sample to the next. Therefore, the conventional addition of solid asphaltites may not provide a predictably uniform change in the rheological properties of asphalt.

As can be seen from the above, the art is replete with methods to improve asphalt compositions. The needed elements for the commercial success of any such process include keeping the process as simple as possible, reducing the cost of the ingredients, and utilizing available asphalt cuts from a refinery without having to blend in more valuable fractions, or at least reduce the amounts of those fractions. In addition, the resulting asphalt composition must meet the above-mentioned governmental physical properties and environmental concerns. Thus, it is a goal of the industry to reduce the cost of adding or the proportion of any modifiers added to the asphalt without sacrificing any of the other elements.

SUMMARY OF THE INVENTION

There is provided, in one form, a method for improving an asphalt composition comprising adding to an asphalt a synthetic flux oil, where the synthetic flux oil comprises at least one asphaltite and a carrier oil comprising either a naphthenic or paraffinic hydrocarbon oil.

In another embodiment of the invention, there are provided asphalt compositions made by the process described above. A further embodiment of the invention includes the effective synthetic flux oils per se.

DETAILED DESCRIPTION OF THE INVENTION

The present invention is directed to a synthetic flux oil that improves the MP1 PG test results of asphalts as compared to asphalts not containing the synthetic flux oil, which in turn contains asphaltites such as gilsonite. In particular, the synthetic flux oil improves the MP1 temperature spread. The term "MP1 spread" as used herein refers to difference between the minimum of the high temperature PG test values and the maximum of the low temperature PG test values. The synthetic flux oil by improving the rheological properties of asphalt allows, for example, larger amounts of asphaltenes to be included in asphalt compositions than previously possible.

To more fully explain the advantages of the present invention, it is helpful to review several terms used herein.

The term "asphaltene", also known as pitch, as used herein, refers to the propane insoluble raffinates, remaining after refining crude oil, such as after deep vacuum distillation and a sequential solvent deasphalting processes, to remove oils. "Resins", as used herein refers to any polar aromatic or non aromatic organic solvent extractable oils, obtained from sequential solvent deasphalting processes following the vacuum distillation of crude oil, and having a molecular weight of less than about 200 gm/mol. "Road materials", also known as hot mix, as used herein refers to mixtures of asphalt and aggregate. In one non-limiting embodiment of the invention, a "flux oil" is defined herein as a relatively non-volatile fraction of petroleum used as a diluent to soften asphalt to a desired consistency, as noted, and can be used as a base stock for the manufacture of roofing asphalts. The term "conventional flux oil" as used herein may refer to any fraction distilled from crude oil before asphaltene is left behind.

As used herein, the term "bitumen" (sometimes referred to as "asphalt") refers to all types of bitumens, including those that occur in nature and those obtained in petroleum processing. The choice of bitumen will depend essentially on the particular application intended for the resulting bitumen composition. In some non-limiting embodiments of the invention, the bitumens have an initial viscosity at 140° F. (60° C.) of 250 to 3600 poise depending on the grade of asphalt desired. The initial penetration range (as determined by ASTM Standard, Method D5) of the base bitumen at 77° F. (25° C.) is 40 to 320 dmm, in an alternate embodiment 75 to 150 dmm, when the intended use of the copolymer-bitumen composition is road paving. Bitumens that do not contain any asphaltite, copolymer, sulfur, etc., are sometimes referred to herein as a "base bitumen." "Asphalt" can also include mixtures of asphaltene, resin and a conventional flux oil.

As used herein, the term "volatile solvent" refers to a hydrocarbon solvent that has a distillation point or range that is equal to or less than 350° F. (177° C.). Such solvents are known to vaporize to some extent under ambient conditions and, accordingly, pose environmental concerns relating to hydrocarbon emissions. The term "substantially free of volatile solvent" means that the complete (final) bitumen composition contains less than about 3.5 weight percent of volatile solvent. In one embodiment of the invention, the bitumen composition contains less than about 2 weight percent of volatile solvent and in another embodiment, less than about 1 weight percent of volatile solvent.

"Elastomeric Polymers" are natural or synthetic rubbers and include, but are not necessarily limited to, butyl, polybutadiene, polyisoprene or polyisobutene rubber, ethylene/vinyl acetate copolymer, polyacrylate, polymethacrylate, polychloroprene, polynorbornene, ethylene/propylene/diene (EPDM) terpolymer and advantageously a random or block copolymer of styrene and conjugated dienes. In one non-limiting embodiment of the invention, styrene/conjugated diene block copolymers may be used that are linear, radial, or multi-branched. Styrene/butadiene and styrene/isoprene copolymers having an average molecular weight of between 30,000 and 500,000 have been found to be particularly useful in the present invention.

"Conjugated dienes" refer to alkene compounds having 2 or more sites of unsaturation wherein a second site of unsaturation is conjugated to a first site of unsaturation, i.e., the first carbon atom of the second site of unsaturation is gamma (at carbon atom 3) relative to the first carbon atom of the first site of unsaturation. Conjugated dienes include, by way of non-limiting example, butadiene, isoprene, 1,3-pentadiene, and the like.

"Block copolymers of styrene and conjugated-dienes" refer to copolymers of styrene and conjugated-dienes having a linear or radial, tri-block structure consisting of styrene-conjugated diene-styrene block units that copolymers are represented by the formula:

$S_x\text{-}D_y\text{-}S_z$ where D is a conjugated-diene, S is styrene, and x, y and z are integers such that the number average molecular weight of the copolymer is from about 30,000 to about 500,000. These copolymers are well known to those skilled in the art and are either commercially available or can be prepared from methods known in the art. Such tri-block copolymers may be derived from styrene and a conjugated-diene, wherein the conjugated-diene is butadiene or isoprene. Such copolymers may contain 15 to 50 percent by weight copolymer units derived from styrene in one non-limiting embodiment of the invention, and 25 to 35 percent derived from styrene in another non-limiting embodiment, and 28 to 31 percent derived from styrene in another alternate embodiment of the invention, the remainder being derived from the conjugated diene. These copolymers may have a number average molecular weight range between 50,000 and 400,000 in one non-limiting embodiment of the invention, and between 80,000 and 180,000 in an alternate non-limiting embodiment of the invention. The copolymer can employ an amount of hydrocarbon oil in order to facilitate processing. Examples of suitable oil include plasticizer oil that is a white naphthenic oil. However, when the hydrocarbon oil is a volatile solvent (as defined above), care should be taken to ensure that the amount of solvent contained in the final bitumen composition is less than about 3.5 weight percent.

The term "sulfur" is defined herein as elemental sulfur in any of its physical forms or any sulfur-donating compound. Sulfur-donating compounds are well known in the art and include various organic compositions or compounds that generate sulfur under the mixing or preparation conditions of the present invention. In one non-limiting embodiment, the elemental sulfur is in powder form known as flowers of sulfur. Other sulfur species that can be used in combination with the metal oxides of the invention include, but are not necessarily limited to thiazole derivatives, benzimidazoles, oxazoles, thiurams, dithiocarbamates, and the like, and combinations thereof. In another non-limiting embodiment of the invention, the sulfur is present in an amount ranging from about 0.06% to about 0.6 wt. % of active ingredients based on the asphalt, in another non-limiting embodiment from about 0.1 to about 0.2 wt. %.

The term "desired Rheological Properties" refers to bitumen compositions having a viscosity at 140° F. (60° C.) of from 1600 to 4000 poise before aging.

By "storage stable viscosity" it is meant that the bitumen composition shows no evidence of skinning, settlement, gelation, or graininess and that the viscosity of the composition does not increase by a factor of four or more during storage at 325° F. (163° C.) for seven days. In one non-limiting embodiment of the invention, the viscosity does not increase by a factor of two or more during storage at 325° F. (163° C.) for seven days. In an alternate embodiment of the invention, the viscosity increases less than 50% during seven days of storage at 325° F. (163° C.). A substantial increase in the viscosity of the bitumen composition during storage is not desirable due to the resulting difficulties in handling the composition and in meeting product specifications at the time of sale and use.

The term "aggregate" refers to rock and similar material added to the bitumen composition to provide an aggregate composition suitable for paving roads. Typically, the aggregate employed is rock indigenous to the area where the bitumen composition is produced. Suitable aggregate includes, but is not necessarily limited to, granite, basalt, limestone, and the like.

As used herein, the term "asphalt cement" refers to any of a variety of substantially unblown or unoxidized solid or semi-solid materials at room temperature that gradually liquify when heated. Its predominant constituents are bitumens, which may be naturally occurring or obtained as the residue of refining processing. As mentioned, the asphalt cements are generally characterized by a penetration (PEN, measured in tenths of a millimeter, dmm) of less than 400 at 25° C., and a typical penetration range between 40 and 300

(ASTM Standard, Method D-5). The viscosity of asphalt cement at 60° C. is more than about 65 poise. Asphalt cements are alternately defined in terms specified by the American Association of State Highway Transportation Officials (AASHTO) AR viscosity system.

The asphalt terms used herein are well known to those skilled in the art. For an explanation of these terms, reference is made to the booklet SP-1. For example, Chapter 2 provides an explanation of the test equipment, terms, and purposes. Rolling Thin Film Oven (RTFO) and Pressure Aging Vessel (PAV) are used to simulate binder aging (hardening) characteristics. Dynamic Shear Rheometers (DSR) are used to measure binder properties at high and intermediate temperatures. These are used to predict permanent deformation or rutting and fatigue cracking. Bending Beam Rheometers (BBRs) are used to measure binder properties at low temperatures. These values predict thermal or low temperature cracking. The procedures for these experiments are also described in the above-referenced SUPERPAVE booklet.

Asphalt grading is given in accordance with accepted standards in the industry as discussed in the above-referenced Asphalt Institute booklet. For example, pages 62–65 of the SP-1 booklet include a table entitled Performance Graded Asphalt Binder Specifications. The asphalt compositions are given performance grades, for example, PG 64-22. The first number, 64, represents the average 7-day maximum pavement design temperature in ° C. The second number, e.g. −22, represents the minimum pavement design temperature in ° C. Other requirements of each grade are shown in the table. For example, the maximum value for the PAV-DSR test (° C.) for PG 64-22 is 25° C.

One of the methods commonly utilized in the industry to standardize the measure or degree of compatibility of the rubber with the asphalt is referred to as the compatibility test. Compatibility tests provide a measure of the degree of separability of materials comprising the asphalt. The long-term compatibility between rubber and the other components of PMA, for example, is an important consideration when preparing road material. If rubber is not compatible with the other components of PMA, then the performance of road materials containing PMA is degraded. Compatibility is assessed by measuring the softening point of asphalt after a period of thermally-induced aging (for example Louisiana DOTD Asphalt Separation of Polymer Test Method TR 326). The test is performed on a polymer-modified asphalt mixture comprised of rubber and asphalt with all the applicable additives, such as the crosslinking agents. The mixture is placed in tubes, usually made of aluminum or similar material, referred to as cigar tubes or toothpaste tubes. These tubes are about one inch (2.54 cm) in diameter and about fifteen centimeters deep. The mixture is placed in an oven heated to a temperature of about 162° C. (320° F.). This temperature is representative of the most commonly used asphalt storage temperature. After the required period of time, most commonly twenty-four (24) hours, the tubes are transferred from the oven to a freezer and cooled down to solidify. The tubes are kept in the vertical position. After cooling down, the tubes are cut into thirds; three equal sections. The Ring and Ball softening point of the top one third is compared to the softening point of the bottom section. This test gives an indication of the separation or compatibility of the rubber within the asphalt. The rubber would have the tendency to separate to the top. The lower the difference in softening point between the top and bottom sections, the more compatible are the rubber and asphalt. In today's environment, many states require a difference of 4° F. (2° C.) or less to consider the asphalt/rubber composition as compatible. Few standards allow a higher difference. The twenty-four hour test is used as a common comparison point. In one non-limiting embodiment of the invention, this compatibility test value is 20° C. or less.

In accordance with another non-limiting embodiment of the present invention, an asphalt composition is prepared by adding the asphalt or bitumen to a mixing tank that has stirring means. The asphalt is added and stirred at elevated temperatures. Stirring temperatures depend on the viscosity of the asphalt and can range up to 500° F. (260° C.). Asphalt products from refinery operations are well known in the art. For example, asphalts typically used for this process are obtained from deep vacuum distillation of crude oil to obtain a bottom product of the desired viscosity or from a solvent deasphalting process that yields a demetalized oil, a resin fraction and an asphaltene fraction. Some refinery units do not have a resin fraction. These materials or other compatible oils of greater than 450° F. (232° C.) flash point may be blended to obtain the desired viscosity asphalt.

Rubbers, elastomeric polymers, or thermoplastic elastomers suitable for this application are well known in the art as described above. For example, FINA-PRENE® SBS rubber products available from Atofina Elastomers Inc. are suitable for the applications of the present invention. This example is not limiting for the inventive technology that can be applied to any similar elastomeric product, particularly those produced from styrene and butadiene.

Various crosslinking agents for asphalt applications may also be used. In one non-limiting embodiment, elemental sulfur, an accelerator and divalent metal oxide compounds are used (in one non-limiting embodiment, zinc oxide). These crosslinking agents are normally sold in powder or flake form.

One embodiment of the present invention is directed to a synthetic flux oil comprising one or more asphaltites and a carrier oil, with the asphaltite dissolved in the carrier oil. The carrier oil may be any oil that asphaltites are highly soluble in. For example, the carrier oil includes, in one non-limiting embodiment, a hydrocarbon having an aromatic content of up to about 50 wt %. In one non-limiting embodiment if the invention, the carrier oil is a paraffinic oil with little or no naphthenic content. In a different non-limiting embodiment of the invention, little or no naphthenic content means 5 wt % or less, alternatively, 2 wt % or less. In another non-limiting embodiment of the invention, the hydrocarbons of the carrier oil have composition including, but not necessarily limited to, between about 53 wt % and about 58 wt % nonpolar aromatics, between about 12 wt % and about 14% polar aromatics, and between about 27 wt % and about 34 wt % saturates. In certain embodiments, for example, a first class of carrier oil includes, but is not necessarily limited to, HYDROLENE® oils (available from Sunco, Inc. Philadelphia, Pa.) such as, HYDROLENE® 110T, HYDROLENE® 600T, HYDROLENE® 180T, Hydrolene 225T and/or mixtures thereof. These hydrocarbon oils are expected to require the use of applied heat and/or substantial mixing to dissolve the asphaltite into them. It will generally be found to be necessary to keep the synthetic flux oils made from these hydrocarbon oils at a minimum elevated temperature and/or in a minimum agitation state to deliver them to be mixed with the asphalt to minimize separation and stability concerns.

In another non-limiting embodiment of the invention, certain of the hydrocarbon oils can be used to dissolve asphaltites without the use of added heat or increased temperature, except, of course, evolved temperatures from friction due to necessary mixing. Suitable examples of this second class of carrier oils include, but are not necessarily limited to, SUNPAVE oil available from Sunoco Inc.; TUFFLO® naphthenic process oil and/or TUFFLO® paraffinic process oil available from Citgo Petroleum Corp; and the like. Characteristics of this second group of carrier oils is that they are pumpable at ambient temperatures and have relatively high flash points. By "pumpable at ambient temperatures" is meant that they can be pumped at or about the temperature of the environment without using extraordinarily different pumping force or unusual pumps. By "relatively high flash points" is meant a temperature of about 450° F. (about 232° C.) or higher. In another non-limiting embodiment of the invention, this second class of carrier oils should not be waxy, and if they are paraffinic, should be highly branched. By "highly branched" is meant a linear series of carbon atoms with subordinate side chains of one or more carbon atoms.

Any asphaltite may be used to prepare the synthetic flux oil. In certain non-limiting embodiments, suitable asphaltites include, but are not necessarily limited to, gilsonite (commercially available from American Gilsonite Company, Ziegler Chemical & Mineral Corporation, and elsewhere), and the like and mixtures thereof. The asphaltite content may range up to about 80 percent by weight of the total weight of the synthetic flux oil. In certain non-limiting, alternate embodiments of the invention, the asphaltite comprises between about 20 and about 30 percent by weight, and in another non-limiting embodiment of the invention between about 24 and about 26 percent by weight, of the total weight of the synthetic flux oil.

Another embodiment of the present invention is directed to a method of preparing a synthetic flux oil, as well as the flux oil per se. The method includes adding one or more of any of the above-described asphaltites to any of the above-described carrier oils while stirring the carrier oil at a mixing speed, mixing temperature and mixing period sufficient to dissolve substantially all of the asphaltites in the carrier oil. In the case of the first class of carrier oils, heating is also required. In one non-limiting embodiment of the invention, the mixing temperature may be between about 200° F. and about 500° F, and in another non-limiting embodiment between about 350° F. and about 400° F. In an alternate non-limiting embodiment of the invention, the mixing speed is sufficient to achieve a vortex in a container holding the carrier oil and the asphaltite. In certain non-limiting embodiments, for example, the mixing speed is between about 20 and about 2500 rpm.

One advantage in preparing a synthetic flux oil comprising a liquified asphaltite, as compared to directly using solid powder or chips of asphaltite, is that certain preparations of synthetic flux oil have rheological properties that are within the testing range of the instrumentation commonly used for performing the above-described MP1 tests. Measuring the MP1 properties of the synthetic flux oil provides insights as to the amounts of asphaltites necessary to add to the synthetic flux oil in order to obtain flux oil preparations that would consistently modify the MP1 properties of asphalt. For example, in certain embodiments, the synthetic flux oil comprises sufficient amounts of asphaltites to provide a spread of at least about 90° C. between the maximum and minimum temperatures in the MP1 asphalt binder specifications.

Alternatively, in some instances, it may be more desirable to measure the viscosity (according to ASTM D2171) or the penetration (according to ASTM D5) of the synthetic flux oil. In certain non-limiting embodiments, for example, the synthetic flux oil comprises sufficient amounts of asphaltites to provide an initial viscosity at about 140° F. (about 60° C.) between about 1000 and about 1600 poise (1 to 16 Pa-s), and in an alternate, non-limiting embodiment of the invention from about 1300 poise (about 13 Pa-s). In other alternate embodiments of the invention, the synthetic flux oil comprises sufficient amounts of asphaltites to provide a penetration at about 77° F. (about 25° C.) of between about 100 and about 200 dmm, and in an alternate, non-limiting embodiment of the invention about 150 dmm.

Yet another embodiment of the present invention is directed to an asphalt composition comprising asphaltene and synthetic flux oil. The synthetic flux oil may include any of the asphaltites dissolved in any of the carrier oils whose compositions are described elsewhere herein. Similarly, the asphaltene may comprise any of the compositions and amounts as described elsewhere herein. The amount of synthetic flux oil necessary to add to asphalt is determined by the extent to which the asphalt's rheological properties must be improved in order to be acceptable for use as road material. The asphalt composition is characterized by having a MP1 spread between low and high temperature performance grade temperatures that is greater than a MP1 spread between low and high temperature performance grade temperatures for a substantially similar asphalt composition in the absence of the synthetic flux oil. Alternatively, the addition of the synthetic flux oil may allow for larger proportions of asphaltenes to be included in the asphalt in some situations. In certain non-limiting embodiments, for example, an asphalt comprised of about 29 to about 38 wt % asphaltene, about 14 to about 15 wt % synthetic flux oil and balance resin, has a MP1 spread of between about 80 and about 110° C., and meets a MP1 specification of at least about PG64-22.

The synthetic flux oil of the present invention, when added to PMA, allows for the use of lower amounts of polymer or crosslinking agents and larger proportions of asphaltenes. Conventionally prepared PMAs typically have greater than about 4 wt % to 4.5 wt % of conventional polymers, for example thermoplastic elastomers such as FINAPRENE® 502 (available from Atofina Elastomers Inc., Houston Tex.), to provide adequate fatigue and crack resistance in asphalt samples comprising at most about 15 wt % of asphaltene. In comparison, for certain non-limiting embodiments, the PMA comprises about 36 wt % asphaltene, about 14 wt % synthetic flux oil, about 3.5 wt % polymer and balance resin, and has a MP1 Spread at least about 88° C., and meets, for example, a MP1 specification of least about PG76-22. In certain embodiments, the use of the synthetic flux oil provides a PMA with acceptable compatibility without the use of a conventional crosslinking agent. For example, in certain embodiments, the PMA in the absence of crosslinking agent has a compatibility test value of less than about 4° C. and in an alternate, non-limiting embodiment less than about 1° C. In other non-limiting, alternative embodiments, the asphalt composition comprises at least about 10 wt % HYDROLENE®, as provided through the inclusion of the synthetic flux oil of the present invention. In yet other embodiments, the compatibility test value is less than ±2° C. different as compared to a compatibility test value obtained for a substantially similar asphalt composition except also having a conventional crosslinking agent, such as zinc oxide, 2-mercaptobenzothiazole or combinations thereof.

Yet another embodiment of the present invention is directed to a road material composition that includes of an asphalt composition and aggregate. The asphalt composition is comprised of asphaltene and the synthetic flux oil of the present invention. Any of the herein described preparations of synthetic flux oil and asphalts may be used. However, in certain non-limiting embodiments, the asphalt composition includes about 15 wt % of the synthetic flux oil, the synthetic flux oil comprising about 25 wt % gilsonite and about 75 wt % HYDROLENE 180T.

Having described the present invention, it is believed that the same will become even more apparent by reference to the following examples. It will be appreciated that the examples are presented solely for the purpose of illustration and should not be construed as limiting the invention. For example, although the experiments described below may be carried out in laboratory or pilot plant setting, one skilled in the art could adjust specific values, dimensions and quantities up to appropriate values for a full-scale plant, or to accomplish other purposes within the scope of this invention.

EXAMPLES

Two experiments were conducted to measure selected rheological properties of different preparations of a synthetic flux oil composition, and to test the effect of adding a preparation the synthetic flux oil on the MP1 tests values obtained for asphalt samples.

Experiment 1

The penetration range and initial viscosity for four different preparations of synthetic flux oil were tested. Penetration was measured at 77° F. (25° C.) (designated as "pen@77F") according to ASTM D5 and reported in units of tenths of a millimeter (dmm). Initial viscosity was measured at 140° F. (60° C.) (designated as "vis@140F") according to ASTM D2171 and reported in units of poise (P). The preparations of synthetic flux oil comprised different amounts of gilsonite dissolved in HYDROLENE 180T, in the proportions summarized in TABLE 1. Suspension was facilitated by preheating the HYDROLENE 180T to between about 350° F. and about 375° F. (about 177 and about 191° C.), and by stirring the mixture at a low shear rate using a propeller-type stirrer at about 20 rpm. Suspension was achieved after about 60 min. to about 120 min. of such mixing. Representative results, as shown in TABLE 1, reveal substantial increases in viscosity and decreases in penetration for preparations having increasing amounts of gilsonite.

TABLE 1

|  | Sample | | | |
|---|---|---|---|---|
|  | A | B | C | D |
| Composition | | | | |
| Gilsonite (wt %) | ~10 | ~20 | ~25 | ~30 |
| HYDROLENE ® (wt %) | ~90 | ~80 | ~75 | ~70 |
| Test Results | | | | |
| vis@140° F. (60° C.) (P) | ~13.1 | ~208 | ~1312 | ~7550 |
| pen@77° F. (25° C.) (dmm) | ~84 | ~270 | ~146 | ~>300 |

Experiment 2

Based on the penetration and viscosity values determined for the preparations in Experiment 1, it was judged that the synthetic flux oil preparation C, either alone or when combined with asphaltenes and resins, would provide MP1 test values within the test range of the available instrumentation. The compositions of the samples tested are presented in Table 2. Synthetic flux oil preparation C (designated as, "FO-C") was tested. In addition, two Asphalt samples (designated as, "Ash1" and "Ash2," respectively) were prepared by mixing synthetic flux oil preparation C with Asphaltene ("Ash") and Resin ("Res") obtained from an oil refinery plant such as the Atofina Port Arthur Refinery. Polymer modified asphalt preparations were examined, both before (designated as, "PMA (pre XL)"), and after cross-linking the polymer (designated as, "PMA (post XL)").

To prepare the asphalt samples, synthetic flux oil was added to a mixture of asphaltene and resin while blending these three components using a conventional low shear mixer at about 250 rpm at about 380° F. (193° C.) for about 60 min. PMA was prepared by adding about 3.5 wt % of FINAPRENE® 502, a styrene butadiene block co-polymer (Atofina, Houston, Tex.), to the mixture of synthetic flux oil asphalt, resin and FO-C, with proportionate decreases in the weight percent of these three components. The resulting PMA mixture was blended in a conventional high shear mixer at about 2500 rpm for about 60 minutes at about 350° F. (177° C.). To crosslink the PMA, a crosslinking agent, comprising sulfur/ZMBT was added to provide a concentration of about 0.25 wt % in the PMA, and blending was continued on the low shear mixer at approximately 100 rpm and 350° F. (177° C.) for 60 min. The MP1 tests were performed as described elsewhere herein. Representative results of MP1 tests are summarized in Table 2.

TABLE 2

|  | Sample | | | | |
|---|---|---|---|---|---|
|  | FO—C | Asp1 | Asp2 | PMA (pre XL) | PMA (post XL) |
| Composition | | | | | |
| FO—C (wt %) | 100 | ~15 | ~14 | ~14.4 | ~14.4 |
| Ash (wt %) | 0 | ~38 | ~29 | ~36.7 | ~36.6 |
| Res (wt %) | 0 | ~47 | ~57 | ~45.3 | ~45.2 |
| MP1 Tests | | | | | |
| DSR (° C.) | ~60.8 | ~66.0 | ~67.6 | nm | ~78.4 |
| RTFO-DSR (° C.) | ~61.9 | ~64.9 | ~67.9 | nm | ~75.8 |
| PAV-DSR (° C.) | ~−2.2 | ~23.6 | ~22 | nm | ~25.0 |
| BBR (m-value) (° C.) | ~−48.3 | ~−13.5 | ~−13.7 | nm | ~−13.1 |
| BBR (s-value) (° C.) | ~48.7 | ~−12.7 | ~−14.1 | nm | ~−14.6 |
| MP1 Spread (° C.) | ~109.2 | ~77.6 | ~81.3 | nm | ~88.9 |
| Compatibility (° F.) | nm | nm | nm | ~0.1 (0.06° C.) | ~0.9 (0.5° C.) | nm: not measured

MP1 tests preformed on preparation FO-C revealed a surprisingly large spread between the minimum of the high temperature test values and the maximum of the low temperature test values, herein designated as the MP1 spread. When this synthetic flux oil preparation was mixed with asphaltene and resin, the resulting asphalts (Asp1 and Asp2) also had larger than expected MP1 spreads, given the relatively large amount of Asphaltene present in these samples. For example, both Asp1 and Asp2, would meet a MP1 PG64-22 specification. In comparison, to meet this MP1 specification, typically only a maximum of about 15 wt % of asphaltene could be included in a conventional asphalt composition having a similar amounts of a conventional flux oil and balance resin. Conversely, for asphalt samples containing similar proportions of asphaltene, resin, and a conventional flux oil as for Ash1 and Ash2, a MP1 spread of less than less than 90° C. would be expected.

The results in Table 2 also demonstrate that the inclusion of synthetic flux oil in PMA allows the use of more asphaltene and less FINAPRENE 502, as compared to conventional PMAs. For example, the PMA sample depicted in Table 2 would have passed a MP1 PG76-22 specification with only a slight increase in the weight percent of FINAPRENE 502 used (e.g., about 3.65 wt %). In comparison, in order to meet a PG76-22 specification for a conventional PMA having a conventional flux oil, at least about 4 wt % to 4.5 wt % FNAPRENE 502 would have to be used. Moreover the conventional PMA would contain a maximum of about 50 wt % asphaltene.

Surprisingly, the compatibility of PMA before crosslinking (i.e., PMA (Pre XL)) was equal to or better than the compatibility of PMA after crosslinking (i.e., PMA (Post XL)). In comparison, a PMA containing about 15 wt % of a conventional flux oil, only about 15 wt % Asphaltene and about 4 wt % FINAPRENE 502, with no crosslinking, would have a compatibility of greater than about 4® F. (2° C.). It is believed that the excellent compatibility obtained for uncrosslinked PMA was related to the presence of at least about 10 wt % HYDROLENE® 180T in the PMA. For example, the PMA (Pre XL) sample in Table 2 contained about 12 wt % HYDROLENE® 180T, introduced via the addition of about 14 to 15 wt % of the synthetic flux oil into the PMA.

In the foregoing specification, the invention has been described with reference to specific embodiments thereof, and has been demonstrated as effective in providing methods for preparing asphalt and/or asphalt/polymer compositions using the synthetic flux oils of the invention. However, it will be evident that various modifications and changes can be made thereto without departing from the broader spirit or scope of the invention as set forth in the appended claims. Accordingly, the specification is to be regarded in an illustrative rather than a restrictive sense. For example, specific combinations or amounts of asphalt, polymer, crosslinker, synthetic flux oil, asphaltite, and other components falling within the claimed parameters, but not specifically identified or tried in a particular asphalt or PMA system, are anticipated and expected to be within the scope of this invention. Further, the methods of the invention are expected to work at other conditions, particularly temperature, pressure and proportion conditions, than those exemplified herein.

We claim:

1. A method of improving an asphalt composition comprising adding to an asphalt a synthetic flux oil to form a modified asphalt, wherein the synthetic flux oil comprises at least one asphaltite and a carrier oil comprising a paraffinic oils and less than about 5 wt. % naphthenic content.

2. The method of claim 1, where the asphaltite is gilsonite.

3. The method of claim 1, where the carrier oil is pumpable at normal processing temperatures between ambient and 400° F. (204° C.) and has a flash point of about 450° F. (about 232° C.) or higher.

4. The method of claim 1, where the asphaltite comprises between about 20 and about 30 percent by weight of a total weight of said synthetic flux oil.

5. The method of claim 1 further comprising producing the flux oil by mixing the asphaltite into the carrier oil while heating and stirring at a temperature between about 200 and about 400° F. (about 93 and about 204° C.) for a period of time sufficient to dissolve substantially all of the asphaltite into the carrier oil.

6. The method of claim 1 further comprising producing the flux oil by mixing the asphaltite into the carrier oil in the absence of added heat.

7. The meted of claim 1, where the synthetic flux oil comprises a sufficient amount of asphaltites to provide temperature spread of the modified asphalt of at least about 90° C. between the maximum and minimum temperatures of the MP1 binder specification.

8. An asphalt composition comprising an asphalt and a synthetic flux oil, wherein the synthetic flux oil comprises at least one asphaltite and a carrier oil comprising a paraffinic oil and less than about 5 wt. % naphthenic content.

9. The asphalt composition of claim 8, where the asphaltite is gilsonite.

10. The asphalt composition as recited in claim 9 further comprising a thermoplastic elastomeric polymer in an amount of about 1 to about 6 wt % to produce a polymer modified asphalt (PMA) having a compatibility test value (difference between top and bottom softening points) of 20° C. or less.

11. The asphalt composition of claim 8, where the carrier oil comprises between about 53 wt % and about 58 wt % nonpolar aromatics, between about 12 wt % and about 14% polar aromatics, and between about 27 wt % and about 34 wt % saturates.

12. The asphalt composition of claim 8, where the carrier oil is pumpable at temperatures between ambient and 400° F. (204° C.) and has a flash point of about 450° F. (about 232° C.) or higher.

13. The asphalt composition of claim 8, where the asphaltite comprises between about 20 and about 30 percent by weight of a total weight of said synthetic flux oil.

14. The asphalt composition of claim 8, where the asphalt composition is made by a process comprising
    producing the flux oil by mixing the asphaltite into the carrier oil while heating and stirring at a temperature between about 200 and about 380° F. (about 93 and about 193° C.) for a period of time sufficient to dissolve substantially all of the asphaltite into the carrier oil; and
    adding the flux oil to the asphalt at a temperature between about 200 and about 380° F. (about 93 and about 193° C.).

15. The asphalt composition of claim 8, where the asphalt composition is made by a process comprising
    producing the flux oil by mixing the asphaltite into the carrier oil in the absence of added heat; and
    adding the flux oil to the asphalt at a temperature between about 200 and about 380° F. (about 93 and about 193° C.).

16. The asphalt composition of claim 8, where the synthetic flux oil comprises a sufficient amount of asphaltites to provide temperature spread of at least about 90° C. between the maximum and minimum temperatures of the MP1 binder specification.

17. A synthetic flux oil comprising at least one asphaltite and a carrier oil, where the carrier oil comprises a hydrocarbon selected from the group consisting of naphthenic or paraffinic oils, and where the asphaltite comprises between about 20 and 30 weight percent of the total weight of said synthetic flux oil and wherein the carrier oil comprises between about 53 wt % and about 58 wt % nonpolar aromatics, between about 12 wt % and about 14% polar aromatics, and between about 27 wt % and about 34 wt % saturates.

18. A synthetic flux oil comprising at least one asphaltite and a carrier oil, where the carrier oil comprises a hydrocarbon selected from the group consisting of naphthenic or paraffinic oil, and where the asphaltite comprises between about 20 and 30 weight percent of the total weight of said synthetic flux oil and where the carrier oil is pumpable at temperatures between ambient and 400° F. (204° C.) and has a flash point of about 450° F. (232° C.) or higher.

19. A synthetic flux oil comprising at least one asphaltite and a carrier oil, where the carrier oil comprises a hydrocarbon selected from the group consisting of naphthenic or paraffinic oils, and where the asphaltite comprises between about 20 and 30 weight percent of the total weight of said synthetic flux oil and made by the process comprising mixing the asphaltite into the carrier oil while heating and stirring at a temperature between about 200 and about 380° F. (about 93 and about 193° C.) for a period of time sufficient to dissolve substantially all of the asphaltite into the carrier oil.

* * * * *